United States Patent [19]
Gildersleeve et al.

[11] Patent Number: 5,989,432
[45] Date of Patent: Nov. 23, 1999

[54] DYNAMIC SUPPORTED MEMBRANE ASSEMBLY AND METHOD OF MAKING AND USING IT

[75] Inventors: Michael R. Gildersleeve, Nesconset; Tony Alex, Merrick; Thomas C. Gsell, Glen Cove; Peter J. Degen, Huntington, all of N.Y.

[73] Assignee: Pall Corporation, East Hills, N.Y.

[21] Appl. No.: 08/924,836

[22] Filed: Sep. 5, 1997

Related U.S. Application Data

[63] Continuation of application No. 08/388,310, Feb. 14, 1995, abandoned.

[51] Int. Cl.$^6$ ..................................... B01D 61/00
[52] U.S. Cl. ........................ 210/650; 96/11; 210/321.61; 210/321.67; 210/490; 264/45.1
[58] Field of Search ................. 210/321.61, 359, 210/388, 490, 503–509, 650, 321.63, 321.84, 321.85, 500.36, 500.38, 500.41, 500.42, 767, 651, 321.67; 428/137, 219; 264/45.1; 96/11, 12; 95/45

[56] References Cited

U.S. PATENT DOCUMENTS

| | | |
|---|---|---|
| 3,019,186 | 1/1962 | Powers . |
| 3,246,767 | 4/1966 | Pall et al. . |
| 3,616,149 | 10/1971 | Wincklhofer et al. . |
| 4,111,815 | 9/1978 | Walker et al. . |
| 4,186,235 | 1/1980 | Bramwell . |
| 4,196,027 | 4/1980 | Walker et al. . |
| 4,212,733 | 7/1980 | Goto et al. . |
| 4,340,479 | 7/1982 | Pall . |
| 4,360,433 | 11/1982 | Walker et al. . |
| 4,536,440 | 8/1985 | Berg . |
| 4,728,394 | 3/1988 | Shinjou et al. . |
| 4,758,251 | 7/1988 | Swedo et al. . |
| 4,795,559 | 1/1989 | Shinjou et al. . |
| 4,855,108 | 8/1989 | Masuda et al. . |
| 4,935,139 | 6/1990 | Davidson et al. . |
| 4,950,454 | 8/1990 | Masuda et al. . |
| 5,063,108 | 11/1991 | Whetstone . |
| 5,089,122 | 2/1992 | Chmiel . |
| 5,108,827 | 4/1992 | Gessner . |
| 5,256,288 | 10/1993 | Lee ..................................... 210/321.61 |
| 5,458,719 | 10/1995 | Pall et al. .............................. 156/285 |
| 5,567,615 | 10/1996 | Degen et al. .......................... 210/767 |
| 5,580,459 | 12/1996 | Nielsen et al. . |
| 5,665,235 | 9/1997 | Gildersleeve et al. .................. 210/508 |
| 5,679,249 | 10/1997 | Fendya et al. ..................... 210/321.84 |

FOREIGN PATENT DOCUMENTS

| | | |
|---|---|---|
| 241221 | 10/1987 | European Pat. Off. . |
| 515045 | 11/1992 | European Pat. Off. . |
| 576343 | 12/1993 | European Pat. Off. . |
| 4234816 | 10/1993 | Germany . |
| WO92/11405 | 7/1992 | WIPO . |
| WO94/11556 | 5/1994 | WIPO . |

OTHER PUBLICATIONS

"Textile Fibers Hoechst Celanese Corporation: Celbond® Staple Fibers" (Mar. 1991).
Database WPI, Week 1991/31, Derwent Publication Ltd., AN 91–172931 (JP 3146107 abstract) (1991).
"Cylindrical Filter and its Production" (Mar. 1991).
Patent Abstracts of Japan, European Patent Office, AN 01284105 (JP 3146107 abstract) (Oct. 31, 1989).

*Primary Examiner*—Joseph W. Drodge
*Attorney, Agent, or Firm*—Leydig, Voit & Mayer, Ltd.

[57] ABSTRACT

The present invention provides a supported membrane assembly comprising a membrane adhered to a support material by way of a nonwoven web of multicomponent fibers therebetween, wherein the multicomponent fibers comprise a first polymer and a second polymer such that the second polymer is present on at least a portion of the surface of the multicomponent fibers and has a softening temperature below the softening temperatures of the first polymer, the membrane, and the support material, and the supported membrane assembly has a water flow rate at least about 20% of the water flow rate of the membrane alone. The present invention also provides a filter element comprising a housing and such a supported membrane assembly, as well as a method of preparing such a supported membrane assembly and methods of using such a supported membrane assembly.

49 Claims, No Drawings

DYNAMIC SUPPORTED MEMBRANE ASSEMBLY AND METHOD OF MAKING AND USING IT

This is a continuation of application Ser. No. 08/388,310 filed on Feb. 14, 1995, now abandoned.

TECHNICAL FIELD OF THE INVENTION

The present invention pertains to a supported membrane assembly, i.e., a membrane adhered to a support material. The present invention also pertains to a method of preparing such a supported membrane assembly, as well as methods of using such a supported membrane assembly.

BACKGROUND OF THE INVENTION

Filtration media have been used for the filtration of fine particles from fluids, particularly liquids, for many years. Such filtration media are available in a variety of materials to meet particular filtration requirements. Microporous membranes, such as those described in U.S. Pat. No. 4,340,479, are particularly well-suited to the filtration of fine particulate matter from fluids.

Many filtration media, such as microporous membranes, possess the ability to remove fine particles but unfortunately suffer from a lack of mechanical strength, e.g., they are relatively fragile. As a result, a support material is often mated with such a filtration medium in order to provide the filtration medium with an adequate degree of mechanical support. This is particularly the case when the filtration medium is used in high shear or pulsed flow environments or is subjected to high backflow pressures.

There have been many attempts at mating filtration media, particularly microporous membranes, to suitable support materials. These attempts have included preparing a filtration medium directly onto a support material, thermally laminating a filtration medium directly onto a support material, and utilizing an adhesive to secure a filtration medium to a support material. Each of these techniques is not without problems, such as weak filtration medium-support adherence, significant blockage of the pores of the filtration medium, alteration of the physical characteristics of the filtration medium, and the introduction of possible contamination sources.

Supported filtration assemblies have been produced by thermally bonding a nonwoven mat of melt-blown fibers to a film. This method involves either pressing a nonwoven mat of fibers against a heated film, preferably as the film is being produced, or melt-blowing the fibers directly onto the film, which may be at ambient or an elevated temperature. This method, however, has general applicability to nonwoven mats and melt-extruded films of the same material, rather than to microporous filtration membranes which could be easily distorted or clogged by this method.

Supported membrane assemblies may also be produced by contemporaneously forming and integrally securing a membrane to the surface of a substrate. This method, however, is severely limited by the requirement that the membrane be precipitated from a liquid suspension and secured to the substrate in a single step. Such porous media, moreover, may delaminate in reverse flow at low pressures, often at differential pressures below about 70 kPa. Moreover, some membranes, which may be employed effectively in filter applications, are not formed from liquid suspension. For example, polytetrafluoroethylene (PTFE) is typically made as a powder, which is then extruded to form a sheet, and the sheet is biaxially stretched to form a porous membrane.

A membrane may also be secured to a substrate by a method which involves the application of a solvent to which the membrane is inert, but which dissolves the support material. The membrane is saturated with the solvent, and then contacted with the support material. The contact of the saturated membrane with the support material dissolves a portion of the support material, which is then integrally secured to the membrane after the solvent is removed. This method has the severe fault that it can be extremely difficult to maintain a uniform distribution of solvent throughout the membrane at the time it is applied to the support material. Simple dipping, or any procedure involving manipulation of the wet membrane, invariably leaves more solvent in some portions of the membrane than in others. As a result, an excessively thick bond may form in some areas of contact, while in other areas the bonding between the membrane and the support material may be inadequate. Also, manipulation of the membrane is made more difficult by the rapid evaporation of the solvent, such that a significant loss of solvent can occur in a few seconds, thereby further complicating the effort of obtaining a uniformly secure bond. Further, as the solvent evaporates during the dissolution and bonding process, there may be migration of dissolved support material into the pores of the membrane such that dissolved support material may be deposited within the membrane, thereby at least partially clogging (i.e., altering the pore size and decreasing the permeability of) the membrane.

Thus, there remains a need for a method for adhering a membrane to the surface of a support material, particularly a rigid support material, which method provides secure adherence of the membrane to the support material without substantially adversely affecting either the membrane or the support material. The present invention seeks to provide such a method and the resulting supported membrane assembly. These and other objects and advantages of the present invention, as well as additional inventive features, will be apparent from the description of the invention set forth herein.

BRIEF SUMMARY OF THE INVENTION

The present invention provides a supported membrane assembly comprising a membrane adhered to a support material by way of a nonwoven web of multicomponent fibers therebetween. The multicomponent fibers comprise a first polymer and a second polymer such that the second polymer is present on at least a portion of the surface of the multicomponent fibers and has a softening temperature below the softening temperatures of the first polymer, the membrane, and the support material. The supported membrane assembly has a water flow rate at least about 20% of the water flow rate of the membrane alone. The present invention also provides a filter element comprising a housing and such a supported membrane assembly, as well as a method of preparing such a supported membrane assembly and methods of using such a supported membrane assembly.

DESCRIPTION OF THE PREFERRED EMBODIMENTS

The supported membrane assembly of the present invention comprises a membrane adhered to a support material by way of a nonwoven web of multicomponent fibers therebetween, wherein the multicomponent fibers comprise a first polymer and a second polymer such that the second polymer is present on at least a portion of the surface of the multicomponent fibers and has a softening temperature below the softening temperatures of the first polymer, the membrane, and the support material, and the supported membrane assembly has a water flow rate at least about 20% of the water flow rate of the membrane alone.

Membrane

Any suitable porous membrane can be used in the context of the present invention. Suitable membranes include microporous membranes (e.g., membranes generally having pore ratings of about 20 nm to about 100 μm or more), ultrafiltration membranes (e.g., membranes generally having pore ratings of less than about 20 nm), nanofiltration membranes, and reverse osmosis membranes. The membrane may be prepared from any suitable material, such as metals, ceramics, and polymers. Suitable metallic membranes include steel, e.g., stainless steel, and nickel membranes. Stainless steel membranes are commercially available as PMM® Metal Membrane Filters (Pall Corporation, East Hills, N.Y.). The membrane is preferably prepared from a polymeric material such as polyamide, polyvinylidene fluoride, polytetrafluoroethylene, polyethersulfone, polyethylene, and polypropylene. More preferred membranes are polyamide, e.g., nylon, and polytetrafluoroethylene membranes, with the most preferred membrane being a polytetrafluoroethylene membrane. The preparation of such membranes is described in, for example, U.S. Pat. No. 4,340,479, and such membranes are commercially available under a variety of trademarks, such as Ultipor® (Pall Corporation, East Hills, N.Y.).

Nonwoven Web

The nonwoven web of multicomponent fibers can comprise any suitable amounts of the first and second polymers such that the second polymer is present on at least a portion of the surface of the multicomponent fibers and has a softening temperature below the softening temperatures of the first polymer, the membrane, and the support material. Typically, the multicomponent fibers comprise at least about 10 wt. % of a first polymer having a first softening temperature and no more than about 90 wt. % of a second polymer having a second softening temperature which is lower than the first softening temperature, as well as the softening temperatures of the membrane and support material. The multicomponent fibers preferably comprise at least about 30 wt. %, more preferably at least about 40 wt. % (e.g., about 40–60 wt. %), of the first polymer and no more than about 70 wt. %, more preferably no more than about 60 wt. % (e.g., about 60–40 wt. %), of the second polymer. The multicomponent fibers preferably comprise a core of the first polymer and at least a partially surrounding surface coating of the second polymer. More preferably, the multicomponent fibers comprise a core of the first polymer and a sheath of the second polymer (i.e., the second polymer forms a continuous coating over the surface of the core of the first polymer).

The multicomponent fibers of the nonwoven web can be prepared from any suitable polymers. Preferably, at least the second polymer, and more preferably also the first polymer, are thermoplastic polymers. Most preferably, the multicomponent fibers of the nonwoven web will be prepared from suitable polyolefins and/or polyesters. Suitable polymers include polyester, polyethylene, polypropylene, and polymethylpentene. The first polymer is preferably polyester, with the second polymer preferably being polyethylene. The fibers of the nonwoven web can be prepared by any suitable means and formed into a nonwoven web by any suitable means, such as the conventional Fourdrinier paper making processes. While the multicomponent fibers are preferably bicomponent fibers, i.e., fibers prepared from only two polymers, the multicomponent fibers can be prepared from more than two polymers, i.e., the first and/or second polymers as described herein can be thought of as polymer blends. The multicomponent fiber can also comprise a suitable adhesive promoter, e.g., a silane coupling agent, particularly when the membrane or support material is a metal, e.g., stainless steel.

The particular combination of polymers for the multicomponent fibers should be chosen such that the softening temperatures of the first and second polymers differ sufficiently enough that the softening of the second polymer can be effected without adversely affecting the first polymer, as well as the membrane and support material. Thus, the membrane, first polymer, and support material preferably have softening temperatures at least about 20° C. higher, more preferably at least about 50° C. higher, than the softening temperature of the second polymer. The second polymer will typically have a softening temperature of about 110° C. to about 200° C., more typically about 110° C. to about 150° C.. While the melting temperatures of the membrane, support material, and first and second polymers of the nonwoven web can be considered, the softening temperatures provide a more practical measure of the temperatures at which deformation and/or melt flow of the various elements of the present inventive supported membrane assembly can take place.

The fibers used to form the nonwoven web preferably have a mean or average diameter of about 50 μm or less. More preferably, at least 90%, most preferably substantially all, of the fibers forming the nonwoven web have a diameter of about 50 μm or less. The fibers forming the nonwoven web will be typically about 5–50 μm in diameter, more usually about 10–30 μm in diameter. The fibers can have any suitable length, e.g., about 0.5–8 cm.

The nonwoven web can have any suitable sheet (or basis) weight. The nonwoven web preferably has a sheet weight of at least about 20 g/m$^2$, more preferably between about 20 g/m$^2$ and about 200 g/m$^2$, and most preferably between about 20 g/m$^2$ and about 100 g/m$^2$.

The nonwoven web can be of any suitable thickness and generally will be at least about 50 μm thick. The nonwoven web is preferably of sufficient thickness so as to provide the desired peel strength to the supported membrane assembly. Further, the nonwoven web should be of sufficient thickness to provide the desired physical separation between membrane and the support material so as to allow for sufficient lateral flow (e.g., sideways or edgewise flow) through the nonwoven web, thereby minimizing the pressure drop across the supported membrane assembly. The nonwoven web preferably has a thickness of less than about 5000 μm, more preferably less than about 2500 μm, and most preferably about 50 to about 1000 μm.

The nonwoven web should be as uniform as possible as regards thickness. Preferably, the nonwoven web will have a thickness variability of no more than about ±10%, more preferably no more than about ±9%, which represents about 3 standard deviations of the mean thickness of the nonwoven web. Most preferably, the nonwoven web will have a thickness variability of no more than about ±5%.

The nonwoven web can have any suitable air permeability. Typically, the nonwoven web will have an air permeability of about 30,000 to about 500,000 lpm/m$^2$. The nonwoven web preferably has an air permeability of about 100,000 to about 300,000 lpm/m$^2$.

Support Material

The support material can be any suitable material, desirably a material that is more rigid than the membrane and preferably having a tensile strength at least about 5 times the tensile strength of the membrane. Also, the softening temperature of the support material should be greater than the softening temperature of the second polymer of the multicomponent fibers.

The support material will be typically a polymeric material or a metal. Suitable polymeric materials include polyamide (e.g., nylon), polypropylene, polyethersulfone (PES), polysulfone (PSO), polyetherimide (PEI), polyetheretherketone (PEEK), and polyetherketone (PEK). Suitable metallic materials include metals and alloys in a variety of forms, e.g., sheet, fibrous, and mesh forms.

The support material can be porous, such that the filtered fluid flows through the support material, or nonporous, such that the filtered fluid flows laterally through the nonwoven web between the membrane and the support material. The support material is preferably a stainless steel porous sheet, e.g., with chemically etched holes therethrough.

The support material is preferably rendered more amenable to adherence to the nonwoven web by roughening the surface of the support material, e.g., by etching and/or subjecting the support material to heat-treatment or other oxidative surface treatment.

The support material can also be a membrane. Thus, two membranes of the same or different compositions or configurations can be bound to each other by way of the nonwoven web of multicomponent fibers. In such embodiments, the membrane and support material are preferably the same. This can be accomplished by utilizing two membranes of the same composition and configuration or by folding over a single membrane which can be bound to itself by way of the nonwoven web of multicomponent fibers. In embodiments where a membrane is adhered to another membrane (either another distinct membrane or a portion of itself), fluid may flow through one of the membranes, the nonwoven web of multicomponent fibers, and then the other membrane, although it will be more usual that fluid will flow through both of the membranes simultaneously into the nonwoven web of multicomponent fibers where the fluid will then flow laterally between the membranes until reaching a suitable outlet.

Assembly Method

The adherence of the membrane, nonwoven web, and support material is effected by subjecting the nonwoven web to a temperature above the softening temperature of the second polymer but below the softening temperatures of the first polymer, membrane, and support material. In other words, the nonwoven web is subjected to a temperature sufficient to at least partially soften the second polymer without significantly softening the other components of the supported membrane assembly such that the second polymer can melt flow a sufficient extent to effect the desirable adhesion between the nonwoven web and the membrane and support material.

Thus, the present invention provides a method of preparing a supported membrane assembly, wherein the method comprises (a) positioning a nonwoven web of multicomponent fibers between a membrane and a support material to form a supported membrane assembly, wherein the multicomponent fibers comprise a first polymer and a second polymer such that the second polymer is present on at least a portion of the surface of the multicomponent fibers and has a softening temperature below the softening temperatures of the first polymer, the membrane, and the support material, (b) subjecting the nonwoven web to a temperature above the softening temperature of the second polymer and below the softening temperatures of the first polymer, the membrane, and the support material, and (c) applying pressure to said supported membrane assembly while said nonwoven web is at a temperature above the softening temperature of the second polymer such that the membrane and the support material are adhered to the nonwoven web, and the supported membrane assembly has a water flow rate at least about 20% of the water flow rate of the membrane alone.

The nonwoven web can be subjected to such a temperature by any suitable means, including, but not limited to, hot platens, induction, microwave, radio frequency, convection, and the like. For example, assembly can be placed in an oven or on a hot plate or, more preferably, run through heated nip rollers and/or between heated conveying belts, so long as a desirable level of adhesion, e.g., peel strength, is obtained between the layers without undue pore blockage or blinding. Similarly, a portion of the assembly can be brought to the desired temperature and then combined with the remaining portion(s) of the assembly.

Most preferably, heat is applied to the assembly for a period sufficient for the nonwoven web to reach equilibrium at the desired temperature. The length of time for such heating will depend in part on the method by which heat is applied and the precise physical characteristics of the components of the assembly.

While the nonwoven web is at the elevated temperature, i.e., at a temperature above the softening temperature of the second polymer, the assembly is preferably subjected to the application of a suitable amount of pressure which can be effected in any suitable manner, e.g., by nip rolls and the like. The amount of pressure applied to the heated assembly which is needed to effect good adherence of the various components of the assembly will similarly vary depending on the precise method being employed to effect adherence of the assembly components and the physical nature of those components. Generally, an applied pressure of about 5–1500 kPa will be sufficient, with about 10–1000 kPa applied pressure being more typically utilized.

The pressure will need to applied for a sufficient time to allow the second polymer of the multicomponent fibers forming the nonwoven web to deform or melt flow to effect the desired degree of adhesion between the components of the assembly, without adversely affecting, e.g., deforming and/or causing to melt flow, the remainder of the supported membrane assembly. Generally, the desired pressure can be applied for about 1–60 seconds, preferably for about 1–30 seconds.

Care should be exercised to ensure that the applied pressure is not effected in such a manner that adversely affects the supported membrane assembly. In addition, pressure should not be applied to the supported membrane assembly which would render the nonwoven web nonporous or so as to adversely affect the absorption and fluid flow properties across the nonwoven web (lateral and/or vertical flow) to a significant extent, although in some instances it may be desirable to purposefully render a portion of the nonwoven web nonporous, i.e., impermeable to fluid flow, so as to, for example, control fluid flow. Such an approach is particularly useful in fluid-tight sealing the edges of the supported membrane assembly so as to prevent fluid leakage and to direct the flow of fluid to a suitable outlet.

The supported membrane assembly is desirably prepared such that the assembly exhibits sufficiently high permeability and adhesion characteristics. In particular, the supported membrane assembly preferably has a water flow rate at least about 50%, more preferably at least about 70%, and most preferably at least about 90%, of the water flow rate of the membrane alone. The water flow rate is the quantity of water per time period per pressure unit per membrane surface area unit and is expressed herein in terms of ml/min/kPa/m$^2$. The water flow rate is measured, if possible, at an applied pressure of 35 kPa, and all of the water flow rate values reported herein reflect measurements at such an applied pressure.

Moreover, the supported membrane assembly preferably has membrane-nonwoven web and nonwoven web-support material peel strengths of at least about 50 kg/m, more preferably at least about 100 kg/m, and most preferably at least about 150 kg/m, when dry and, most preferably, also after soaking in water at 90° C. for 30 minutes. The supported membrane assembly will ideally have membrane-nonwoven web and nonwoven web-support material peel strengths which are sufficiently high that the supported membrane assembly cannot be peeled apart without destroying the membrane and/or support material.

The present inventive supported membrane assembly preferably can withstand shear rates, such as encountered in dynamic filtration, of at least about 200,000 sec$^{-1}$, more preferably of at least about 400,000 sec$^{-1}$, and most preferably of at least about 500,000 sec$^{-1}$. Similarly, the present inventive supported membrane assembly desirably can withstand backflow pressures of at least about 100 kPa, preferably at least about 200 kPa, more preferably at least about 400 kPa, and most preferably at least about 500 kPa.

Methods of Use

The present inventive supported membrane assembly can be used for any suitable purpose, e.g., for any purpose for which a conventional supported membrane assembly could be used. Since the present inventive supported membrane assembly has excellent adhesion characteristics while retaining good permeability characteristics, the present inventive supported membrane assembly can also be used in applications and environments in which a conventional supported membrane assembly may not be suitable, such as in high shear or pulsed flow environments or in applications where the supported membrane assembly is subjected to high backflow pressures. The present inventive supported membrane assembly is useful in crossflow filtration devices and applications and is particularly well-suited in dynamic filtration devices and applications, especially those involving rotary and vibratory dynamic filtration devices.

Thus, the present invention provides a filter element comprising a housing and the supported membrane assembly of the present invention. Such a filter element can include the present inventive supported membrane assembly in any suitable configuration, including, for example, in a sheet form wherein the support material is a plate, a pleated configuration wherein the support material is a mesh, or a tubular configuration wherein the support material is a tube. The present invention also provides a method of filtering a fluid, which method comprises passing a fluid through the supported membrane assembly of the present invention.

EXAMPLES

The following examples further illustrate the present invention and, of course, should not be construed as in any way limiting its scope.

Example 1

This example illustrates the superior permeability and adhesion characteristics of the present inventive supported membrane assembly. In particular, the permeability was measured of a membrane alone (sample 1A), mated but not bound to a stainless steel support (sample 1B), mated and bound to the nonwoven web of multicomponent fibers without any support material (samples 1C and 1D), mated but not bound to the stainless steel support with a nonwoven web of multicomponent fibers therebetween (samples 1E–1G), and adhered to the nonwoven web and stainless steel support in various ways in accordance with the present invention (samples 1H–1L). The peel strengths of the various embodiments of the present inventive supported membrane assembly were also determined.

The membrane utilized in this series of experiments was a 0.45 $\mu$m pore rated polyamide membrane available as Ultipor® N$_{6,6}$ (Pall Corporation, East Hills, N.Y.). The stainless steel support was a 304 stainless steel plate with a thickness of about 305 $\mu$m and having chemically etched holes of about 380 $\mu$m diameter. These holes, through which the permeate is drained away from the membrane, were spaced about 900 $\mu$m on center apart, thus providing an open area of about 16% for permeation. The stainless steel plate surface was chemically roughened during hole etching, which enhanced membrane bonding. The plate surface was further made more favorable for bonding by exposing the plate to about 370° C. for about 1 hour in an oven.

Two different nonwoven webs of multicomponent fibers were utilized in this series of experiments: Celbond® T105 and T106 fibers (Hoechst-Celanese, Salisbury, N.C.). Both nonwoven webs comprised 100% bicomponent, concentrically oriented fibers having a linear low density polyethylene sheath with a melting temperature of 127° C. and a polyester core with a melting temperature of 256° C..

The T105 nonwoven web had a sheet weight of about 68 g/m$^2$ and was a wet laid, randomly oriented, fibrous nonwoven web composed of about 20 $\mu$m diameter×1.27 cm length, Celbond® T105 fibers. The thickness of the T105 nonwoven web was about 406 $\mu$m (ASTM D-1777 test method), while the air permeability of the web was about 167,600 lpm/m$^2$ (ASTM D-737 test method). The tensile strength of the T105 nonwoven web was about 107 kg/linear m in the machine direction and about 71 kg/linear m in the cross-machine direction (ASTM D-1117 test method).

The T106 nonwoven web had a sheet weight of about 47 g/m$^2$ and was a carded, fibrous nonwoven web composed of about 20 $\mu$m diameter×3.81 cm length, Celbond® 256 fibers. The thickness of the T106 nonwoven web was about 1854 $\mu$m (ASTM D-1777 test method), while the air permeability of the web was about 256,000 lpm/m$^2$ (ASTM D-737 test method). The tensile strength of the T106 nonwoven web was about 223 kg/linear m in the machine direction and about 45 kg/linear m in the cross-machine direction (ASTM D-1117 test method).

Filtrate flux was determined by measuring the flow of deionized water at ambient temperature (e.g., about 20–25° C.) at an applied pressure of about 35 kPa. The water flow rate through the membrane alone was about 99 lpm/m$^2$ or about 2.8 lpm/m$^2$/kPa. The permeability of a particular assembly was calculated by determining the water flow rate at about 35 kPa applied pressure through the assembly and dividing that flow rate by the flow rate through the membrane alone (i.e., about 99 lpm/m$^2$ or about 2.8 lpm/m$^2$/kPa) to obtain a percent permeability.

The bonding of the membrane, nonwoven web, and stainless steel plate was effected by use of either a hot plate or a laminator. Both techniques involve heating to a certain equilibrium temperature, a dwell time at that temperature, and the application of a certain nip pressure, all of which values are set forth in Table 1.

With respect to the use of the hot plate, the stainless steel support was set on a hot plate and heated for 5 minutes to achieve thermal equilibrium at 135–140° C. The temperature was above the melting temperature of the fiber sheath component of the bicomponent fibers and below the melting temperature of the core component of the bicomponent fibers, as well as the membrane and stainless steel support. Once thermal equilibrium was achieved, a layer of the nonwoven web of the bicomponent fibers and the membrane were positioned on top of the stainless steel support such that the nonwoven web contacted both the stainless steel support and the membrane. With the membrane, nonwoven web, and stainless steel support in proper position, a uniform load or nip pressure was applied for the specified dwell time, after which point the supported membrane assembly was allowed to cool at ambient temperature.

As regards the use of the laminator, the supported membrane assembly was properly layered together and then fed into a laminator comprised of heated upper and lower conveying belts through which the assembly was passed. The temperature of the belts was set at 160–170° C., i.e., above the melting temperature of the sheath component of the bicomponent fibers and below the melting temperature of the core component of the bicomponent fibers, as well as the membrane and stainless steel support. The distance between the two belts, referred to as the belt height which was 1.6 mm, was adjusted to approximately the thickness of the unbonded assembly so as to uniformly heat the assembly prior to nip pressure application. Thermal equilibrium was achieved as the assembly traveled down the heated conveying belts, with the dwell time prior to the application of nip pressure (which is determined by the velocity of the conveying belts) as indicated in Table 1. The gap between the lower conveying belt and the nip roll, i.e., the nip height, was 0.4 mm, and the nip roll pressure was as indicated in Table 1. After exiting the nip roll, the supported membrane assembly was allowed to cool at ambient temperature.

The peel strength between two adhered layers was determined in accordance with ASTM D-2724 by peeling the two layers back from each other in opposite directions at an angle of 180°. The peel strength, for purposes of describing the present inventive supported membrane assembly, is the load required to peel one of the two adhered layers away from the other layer (which is fixed) at a rate of 5.08 cm/min at a constant rate of elongation within a 2.54 cm wide by 10.16 cm long strip of the adhered sheets. The peel strength of adhered layers was also determined after each test strip had soaked in water at 90° C. for 30 minutes.

The bonding conditions and physical characteristics of the various assemblies evaluated in these experiments are set forth below in Table 1. The nonwoven web utilized in samples 1C–1E, 1G–1J, and 1L was the T105 nonwoven web, while the nonwoven web utilized in samples 1F and 1K was the T106 nonwoven web.

TABLE 1

| Sample | Assembly | Bonding Method | Bonding Pressure (kPa) | Dwell Time (sec) | Permeability (%) | Dry Peel Strength: Membrane-Nonwoven Web (kg/m) | Wet Peel Strength: Membrane-Nonwoven Web (kg/m) | Dry Peel Strength: Nonwoven Web-Support (kg/m) | Wet Peel Strength: Nonwoven Web-Support (kg/m) |
|---|---|---|---|---|---|---|---|---|---|
| 1A | membrane only | unbonded | N/A | N/A | 100 | N/A | N/A | N/A | N/A |
| 1B | membrane and support only | unbonded | N/A | N/A | 40 | N/A | N/A | N/A | N/A |
| 1C | membrane and nonwoven web only | hot plate | 690 | 20 | 99 | * | * | N/A | N/A |
| 1D | membrane and nonwoven web only | hot plate | 1035 | 20 | 79 | * | * | N/A | N/A |
| 1E | complete | unbonded | N/A | N/A | 95 | 0.0 | 0.0 | 0.0 | 0.0 |
| 1F | complete | unbonded | N/A | N/A | 100 | 0.0 | 0.0 | 0.0 | 0.0 |
| 1G | complete | hot plate | 0 | 20 | 100 | 0.0 | 0.0 | 0.0 | 0.0 |
| 1H | complete | hot plate | 1035 | 20 | 84 | * | * | 80.4 | 80.4 |
| 1I | complete | hot plate | 69 | 30 | 86 | * | * | 119.6 | 89.3 |
| 1J | complete | hot plate | 69 | 60 | 83 | * | * | 123.2 | 92.9 |
| 1K | complete | laminator | 69 | 60 | 81 | * | * | <1.8 | <1.8 |
| 1L | complete | laminator | 104 | 60 | 72 | * | * | 148.2 | 128.6 |

Notes:
"N/A" indicates that the particular peel strength test was not applicable
"0.0" indicates the lack of any significant adhesion between the layers
"*" indicates that the layers could not be peeled apart in a reliable manner without damage As is apparent from the data set forth in Table 1, the present inventive supported membrane assembly has excellent permeability and adhesion characteristics. In particular, the present inventive supported membrane assembly (as exemplified by samples 1H–1L) retains a significant portion of the permeability of the unbound assembly (as exemplified by samples 1E, 1F, and 1G), and even of the membrane alone (as exemplified by sample 1A), while having excellent adhesion characteristics as evidenced by the peel strength values. Indeed, the existence of the nonwoven web of multicomponent fibers has little adverse effect on permeability as illustrated by a comparison of the permeabilities of the present inventive supported membrane assemblies (as exemplified by samples 1H–1L) and the membrane and nonwoven web only (as exemplified by samples 1C and 1D). Moreover, the lateral flow characteristics of the present inventive supported membrane assembly are illustrated by a comparison of the permeabilities of the present inventive assemblies (as exemplified by samples 1H–1L) and the membrane and support only (as exemplified by sample 1B).

The supported membrane assembly utilizing the T105 nonwoven web (as exemplified by samples 1H, 1J, 1I, and 1L) and T106 nonwoven web (as exemplified by sample 1K) had excellent wet and dry peel strength characteristics as between the membrane and nonwoven web. The supported membrane assembly utilizing the T105 nonwoven web also had good wet and dry peel strength characteristics as between the nonwoven web and support material, while the supported membrane assembly utilizing the T106 nonwoven web had poor wet and dry peel strength characteristics as between the nonwoven web and support material. This difference in peel strengths is believed to be the result of an added chemical adhesion promoter in the fibers of the T105 nonwoven web which is not present in the fibers of the T106 nonwoven web and which improves adhesion to at least stainless steel. Since the T106 nonwoven web was adhered with excellent results to the membrane, it is clear from these results that the T106 nonwoven web could be adhered with excellent results to at least a polymeric support material, if not ceramic and other metal support materials.

Example 2

This example further illustrates the superior permeability and adhesion characteristics of the present inventive supported membrane assembly. In particular, supported membrane assemblies were prepared in a manner similar to that of Example 1 using the previously described polyamide membrane and nonwoven web of the Celbond® T106 fibers, except with a Naltex® 81291 (Nalle Plastics, Inc., Austin, Tex.) polypropylene mesh as the support material rather than a stainless steel plate. The polypropylene mesh was a biplanar, symmetrical filtration mesh composed of 100% polypropylene strands and had a mesh thickness of about 1219 μm, with a strand count of about 2.8 strands/cm and an opening size of about 0.3 cm to give an open area of about 70% for permeation.

The permeability and peel strength of an unbounded and laminated assembly were measured as described in the same manner set forth in Example 1, and the resulting values are set forth below in Table 2.

As is apparent from the data set forth in Table 2, the present inventive supported membrane assembly has excellent permeability and adhesion characteristics. The data also confirm, as suggested by the data of Example 1, that the T106 nonwoven web can be quite useful in bonding a polymeric membrane to a polymeric support material.

Example 3

This example illustrates the poor permeability characteristics of a supported membrane assembly prepared in a manner similar to that of Example 1, except using a nonwoven web of a single component fiber contrary to the dictates of the present invention.

A supported membrane assembly similar to those of Example 1 was prepared using the laminator to effect the bonding of the membrane, nonwoven web, and stainless steel support. The nonwoven web was a fibrous nonwoven web of a single component fiber, namely polypropylene, which is commercially available as Typar® T135 (Midwest Filtration Company, Hamilton, Ohio). The nonwoven web had a sheet weight of about 31 g/m² and was a spunbonded fibrous nonwoven web composed of fibers having a mean diameter of about 23 μm. The thickness of the nonwoven web was about 254 μm (ASTM D-1777 test method), while the air permeability of the web was about 76,200 lpm/m² (ASTM D-737 test method). The tensile strength of the nonwoven web was about 482 kg/linear m in the machine direction and about 268 kg/linear m in the cross-machine direction (ASTM D-1117 test method). The permeability and peel strength of the assembly were measured as described in the same manner set forth in Example 1, and the resulting values are set forth below in Table 3.

TABLE 2

| Sample | Assembly | Bonding Method | Bonding Pressure (kPa) | Dwell Time (sec) | Permeability (%) | Dry Peel Strength: Membrane-Nonwoven Web (kg/m) | Wet Peel Strength: Membrane-Nonwoven Web (kg/m) | Dry Peel Strength: Nonwoven Web-Support (kg/m) | Wet Peel Strength: Nonwoven Web-Support (kg/m) |
| --- | --- | --- | --- | --- | --- | --- | --- | --- | --- |
| 2A | complete | unbounded | N/A | N/A | 100 | 0.0 | 0.0 | 0.0 | 0.0 |
| 2B | complete | laminator | 104 | 60 | 74 | * | * | * | * |

Notes:
"*" indicates that the layers could flot be peeled apart in a reliable manner without damage

TABLE 3

| Sample | Assembly | Bonding Method | Bonding Pressure (kPa) | Dwell Time (sec) | Permeability (%) | Dry Peel Strength: Membrane-Nonwoven Web (kg/m) | Wet Peel Strength: Membrane-Nonwoven Web (kg/m) | Dry Peel Strength: Nonwoven Web-Support (kg/m) | Wet Peel Strength: Nonwoven Web-Support (kg/m) |
| --- | --- | --- | --- | --- | --- | --- | --- | --- | --- |
| 3A | complete | unbounded | N/A | N/A | 100 | 0.0 | 0.0 | 0.0 | 0.0 |
| 3B | complete | laminator | 104 | 60 | 0 | * | * | * | * |

Notes:
"*" indicates that the layers could not be peeled apart in a reliable manner without damage As is apparent from the data set forth in Table 3, while the supported membrane assembly utilizing a nonwoven web of a single component fiber had good peel strength characteristics, such an assembly had very poor permeability characteristics. Indeed, in this particular comparative example, there was no significant permeability. Although the single component fiber consisted of polypropylene, the same results are expected for other single component fibers, such as polyethylene which has a lower melting temperature than polypropylene.

Example 4

This example illustrates the good permeability and adhesion characteristics of another embodiment of the present inventive supported membrane assembly, in particular of a supported membrane assembly similar to those of Example 1 except utilizing a different type of membrane.

A supported membrane assembly was prepared in a manner similar to that set forth in Example 1 using a 1.0 μm pore rated polytetrafluoroethylene (PTFE) membrane (Pall Corporation, East Hills, N.Y.). The permeability and peel strength of the assembly were measured as described in the same manner set forth in Example 1, and the resulting values are set forth below in Table 4.

Example 6

This example further illustrates excellent adhesion characteristics of a membrane bonded to the nonwoven web of multicomponent fibers in accordance with the present invention.

The Celbond® T105 nonwoven web described in Example 1 was attached (by solvent bonding) to a 7 mm thick polyethersulfone plate, which in turn was attached to means to conduct a reverse pressure hold test. A polysulfone ultrafiltration membrane with a 120 kD molecular weight cutoff was adhered to the nonwoven web through use of the laminator in accordance with the method described in Example 1, with a bonding pressure of 104 kPa, a dwell time of 300 sec, a belt height of 7.3 mm, and a nip height of 0.4 mm.

Pressure was then applied to the wetted membrane from the downstream side (i.e., nonwoven web side) of the membrane using filtered air. The reverse pressure started at about 34.5 kPa and was increased in increments of about 34.5 kPa every 60 sec until bond failure was observed.

The bond between the nonwoven web and the membrane remained integral at about 414 kPa for 60 sec, which is indicative of a high degree of bond strength between the nonwoven layer and the membrane. The bond between the

TABLE 4

| Sample | Assembly | Bonding Method | Bonding Pressure (kPa) | Dwell Time (sec) | Permeability (%) | Dry Peel Strength: Membrane-Nonwoven Web (kg/m) | Wet Peel Strength: Membrane-Nonwoven Web (kg/m) | Dry Peel Strength: Nonwoven Web-Support (kg/m) | Wet Peel Strength: Nonwoven Web-Support (kg/m) |
|---|---|---|---|---|---|---|---|---|---|
| 4A | complete | unbonded | N/A | N/A | 100 | 0.0 | 0.0 | 0.0 | 0.0 |
| 4B | complete | laminator | 104 | 60 | 50 | * | * | 117.9 | 112.5 |

Notes:
"0.0" indicates the lack of any significant adhesion between the layers
"*" indicates that the layers could not be peeled apart in a reliable manner without damage As is apparent from the data set forth in Table 4, the supported membrane assembly of the present invention utilizing a PTFE membrane, rather than a polyamide membrane, exhibited good permeability and excellent adhesion characteristics similar to those for the assembly utilizing the polyamide membrane as recited in Example 1.

Example 5

This example further illustrates the good permeability and adhesion characteristics of an embodiment of the present inventive supported membrane assembly under adverse filtration conditions.

The present inventive supported membrane assembly of Example 4 (namely, sample 4B) was installed within a conventional filter housing. A hot protein and fat containing broth was pumped through the supported membrane assembly for the purpose of dewatering the fluid. The filtration was conducted at a feed pressure of about 69 kPa and a feed temperature of about 50–70° C. During the course of the filtration, the protein and fat were rejected by the membrane, thereby causing a clear fluid to permeate the membrane. After 10 hours of filtration, there were no indications of membrane bond failure. Thus, the present inventive supported membrane assembly remains intact even after prolonged exposure to fluids at high feed pressures and high temperatures.

nonwoven web and the membrane failed cohesively when the applied pressure reached about 448 kPa. Thus, the present inventive supported membrane assembly will remain intact even after prolonged exposure to high reverse pressures.

All of the references cited herein, including publications, patents, and patent applications, are hereby incorporated in their entireties by reference.

While this invention has been described with an emphasis upon preferred embodiments, it will be apparent to those of ordinary skill in the art that variations of the preferred embodiments can be used and that it is intended that the invention can be practiced otherwise than as specifically described herein. Accordingly, this invention includes all modifications encompassed within the spirit and scope of the invention as defined by the following claims.

What is claimed is:

1. A supported membrane assembly comprising a membrane adhered to a support material by way of a nonwoven web of multicomponent fibers therebetween, said multicomponent fibers comprising at least about 10 wt. % of a first polymer and no more than about 90 wt. % of a second polymer such that said second polymer forms a sheath covering a core of said first polymer and has a softening temperature below the softening temperatures of said first polymer, said membrane, and said support material, wherein said supported membrane assembly has a water flow rate at least about 50% of the water flow rate of said membrane alone, and wherein the peel strengths between said membrane and nonwoven web and between said nonwoven web and support material are at least about 50 kg/m.

2. The supported membrane assembly of claim 1, wherein said multicomponent fibers comprise at least about 30 wt. % of said first polymer and no more than about 70 wt. % of said second polymer.

3. The supported membrane assembly of claim 2, wherein said multicomponent fibers comprise about 40–60 wt. % of said first polymer and about 60–40 wt. % of said second polymer.

4. The supported membrane assembly of claim 1, wherein said membrane is a microporous polymeric membrane.

5. The supported membrane assembly of claim 1, wherein said first and second polymers are polyolefins.

6. The supported membrane assembly of claim 5, wherein said first polymer is polyester and said second polymer is polyethylene.

7. The supported membrane assembly of claim 1, wherein said nonwoven web of multicomponent fibers has a sheet weight of about 200 g/m² or less.

8. The supported membrane assembly of claim 1, wherein said multicomponent fibers have an average fiber diameter of about 50 μm or less.

9. The supported membrane assembly of claim 8, wherein said nonwoven web has a thickness of about 50 μm to about 5000 μm.

10. The supported membrane assembly of claim 1, wherein said support material is a metallic support material.

11. The supported membrane assembly of claim 10, wherein said support material is porous.

12. The supported membrane assembly of claim 1, wherein said membrane, said first polymer, and said support material have softening temperatures at least about 20° C. higher than the softening temperature of said second polymer.

13. The supported membrane assembly of claim 1, wherein said supported membrane assembly has a water flow rate at least about 70% of the water flow rate of said membrane alone.

14. The supported membrane assembly of claim 13, wherein said supported membrane assembly has a water flow rate at least about 90% of the water flow rate of said membrane alone.

15. The supported membrane assembly of claim 1, wherein a portion of said nonwoven web is impermeable to fluid flow.

16. The supported membrane assembly of claim 15, wherein said supported membrane assembly has edges and at least a portion of said edges are fluid-tight sealed by said impermeable portion of said nonwoven web.

17. A filter element comprising a housing and the supported membrane assembly of claim 1.

18. A method of preparing a supported membrane assembly, wherein said method comprises (a) positioning a nonwoven web of multicomponent fibers between a membrane and a support material to form a supported membrane assembly, wherein said multicomponent fibers comprise at least about 10 wt. % of a first polymer and no more than about 90 wt. % of a second polymer such that said second polymer forms a sheath covering a core of said first polymer and has a softening temperature below the softening temperatures of said first polymer, said membrane, and said support material, (b) subjecting said nonwoven web to a temperature above the softening temperature of said second polymer and below the softening temperatures of said first polymer, said membrane, and said support material, and (c) applying pressure to said supported membrane assembly while said nonwoven web is at a temperature above the softening temperature of said second polymer such that said membrane and said support material are adhered to said nonwoven web, said supported membrane assembly has a water flow rate at least about 50% of the water flow rate of said membrane alone, and the peel strengths between said membrane and nonwoven web and between said nonwoven web and support material are at least about 50 kg/m.

19. The method of claim 18, wherein said multicomponent fibers comprise at least about 30 wt. % of said first polymer and no more than about 70 wt. % of said second polymer.

20. The method of claim 19, wherein said multicomponent fibers comprise about 40–60 wt. % of said first polymer and about 60–40 wt. % of said second polymer.

21. The method of claim 18, wherein said membrane is a microporous polymeric membrane.

22. The method of claim 18, wherein said support material is a metallic support material.

23. The method of claim 22, wherein said support material is porous.

24. The method of claim 18, wherein said supported membrane assembly has a water flow rate at least about 70% of the water flow rate of said membrane alone.

25. The method of claim 24, wherein said supported membrane assembly has a water flow rate at least about 90% of the water flow rate of said membrane alone.

26. The method of claim 18, wherein said supported membrane assembly is subjected to about 5–1500 kPa applied pressure for about 1–60 seconds while said nonwoven web is at a temperature above the softening temperature of said second polymer.

27. The method of claim 18, wherein said method further comprises subjecting said nonwoven web to a temperature and pressure sufficient to render a portion of said nonwoven web impermeable to fluid flow.

28. The method of claim 27, wherein said supported membrane assembly has edges and at least a portion of said edges are fluid-tight sealed by said impermeable portion of said nonwoven web.

29. A filtration device comprising (a) a housing and (b) a supported membrane assembly comprising a membrane adhered to a support material by way of a nonwoven web of multicomponent fibers therebetween, said multicomponent fibers comprising at least about 10 wt. % of a first polymer and no more than about 90 wt. % of a second polymer such that said second polymer is present on at least a portion of the surface of said multicomponent fibers and has a softening temperature below the softening temperatures of said first polymer, said membrane, and said support material, wherein said supported membrane assembly has a water flow rate at least about 50% of the water flow rate of said membrane alone, wherein said filtration device is a dynamic filtration device, and wherein said supported membrane assembly can withstand shear rates of at least about 200,000 sec$^{-1}$.

30. The filtration device of claim 29, wherein said filtration device is a vibratory filtration device.

31. The filtration device of claim 29, wherein said multicomponent fibers comprise at least about 30 wt. % of said first polymer and no more than about 70 wt. % of said second polymer.

32. The filtration device of claim 31, wherein said multicomponent fibers comprise about 40–60 wt. % of said first polymer and about 60–40 wt. % of said second polymer.

33. The filtration device of claim 29, wherein the peel strengths between said membrane and nonwoven web and between said nonwoven web and support material are at least about 50 kg/m.

34. The filtration device of claim 29, wherein said membrane is a microporous polymeric membrane.

35. The filtration device of claim 29, wherein said first and second polymers are polyolefins.

36. The filtration device of claim 35, wherein said first polymer is polyester and said second polymer is polyethylene.

37. The filtration device of claim 29, wherein said multicomponent fibers comprise a core of said first polymer and a sheath of said second polymer.

38. The filtration device of claim 29, wherein said nonwoven web of multicomponent fibers has a sheet weight of about 200 g/m$^2$ or less.

39. The filtration device of claim 29, wherein said multicomponent fibers have an average fiber diameter of about 50 μm or less.

40. The filtration device of claim 39, wherein said nonwoven web has a thickness of about 50 μm to about 5000 μm.

41. The filtration device of claim 29, wherein said support material is a metallic support material.

42. The filtration device of claim 41, wherein said support material is porous.

43. The filtration device of claim 29, wherein said membrane, said first polymer, and said support material have softening temperatures at least about 20° C. higher than the softening temperature of said second polymer.

44. The filtration device of claim 29, wherein said supported membrane assembly has a water flow rate at least about 70% of the water flow rate of said membrane alone.

45. The filtration device of claim 44, wherein said supported membrane assembly has a water flow rate at least about 90% of the water flow rate of said membrane alone.

46. The filtration device of claim 29, wherein a portion of said nonwoven web is impermeable to fluid flow.

47. The filtration device of claim 46, wherein said supported membrane assembly has edges and at least a portion of said edges are fluid-tight sealed by said impermeable portion of said nonwoven web.

48. A method of filtering a fluid, which method comprises passing a fluid through the filtration device of claim 29.

49. The method of claim 48, wherein said membrane is subjected to fluid shear forces of at least about 200,000 sec$^{-1}$.

* * * * *